United States Patent [19]

Brooksby et al.

[11] Patent Number: 5,579,014
[45] Date of Patent: Nov. 26, 1996

[54] PARALLEL CORRELATOR FOR GLOBAL POSITIONING SYSTEM RECEIVER

[75] Inventors: Glen W. Brooksby, Glenville; Gerald J. Michon, Waterford; Jerome J. Tiemann, Schenectady, all of N.Y.

[73] Assignee: General Electric Company, Schenectady, N.Y.

[21] Appl. No.: 376,211

[22] Filed: Jan. 20, 1995

[51] Int. Cl.[6] .............................. H04B 7/185; G01S 5/02
[52] U.S. Cl. ............................................ 342/357; 364/604
[58] Field of Search ........................... 342/357; 364/604, 364/728.03

[56] References Cited

U.S. PATENT DOCUMENTS

| | | |
|---|---|---|
| 4,112,496 | 9/1978 | Stevens . |
| 4,114,155 | 9/1978 | Raab ........................ 343/105 |
| 4,445,118 | 4/1984 | Taylor et al. .............. 343/357 |
| 4,730,340 | 3/1988 | Frazier, Jr. ................... 375/1 |
| 4,894,662 | 1/1990 | Counselman ............... 342/357 |
| 4,928,106 | 5/1990 | Ashjaee et al. ............ 342/352 |
| 4,928,107 | 5/1990 | Kuroda et al. ............. 342/357 |
| 4,983,980 | 1/1991 | Ando .......................... 342/357 |
| 5,093,800 | 3/1992 | Ifune ........................... 364/578 |
| 5,177,490 | 1/1993 | Ando et al. ................. 342/357 |
| 5,181,225 | 1/1993 | Neeser et al. ................... 375/1 |
| 5,271,034 | 12/1993 | Abaunza . |
| 5,293,398 | 3/1994 | Hamao et al. .................. 375/1 |
| 5,483,243 | 1/1996 | Gramlich et al. .......... 342/189 |

FOREIGN PATENT DOCUMENTS

| | | |
|---|---|---|
| 177963A2 | 4/1986 | European Pat. Off. . |
| 486833A1 | 10/1991 | European Pat. Off. . |
| 2136251 | 9/1984 | United Kingdom . |

OTHER PUBLICATIONS

US Patent 5,181,225 (Nesser et al.) is a US counterpart of European Patent 486833A1 (reference AM).

*Primary Examiner*—Theodore M. Blum
*Attorney, Agent, or Firm*—Donald S. Ingraham

[57] ABSTRACT

A correlator for identifying global positioning satellites includes an antenna at a central location for receiving signature signals from a plurality of the satellites. Each received signal is converted from analog to digital form. A filter is employed to correlate each digital signal with a respective, unique code sequence. Each filtered digital signal is supplied to a circuit which produces an indication that identifies each satellite from the filtered digital signal supplied to the circuit.

4 Claims, 5 Drawing Sheets

PARALLEL CORRELATOR FOR GLOBAL POSITIONING SYSTEM RECEIVER

FIELD OF THE INVENTION

The present invention is directed to the field of global positioning systems. In particular, the present invention is directed to systems for identifying satellites and despreading waveforms from them in a communications system, and in at least one embodiment, a GPS-based communications system.

BACKGROUND OF THE INVENTION

The tracking and location of valuable assets such as railcars, shipping containers, truck trailers, automobiles, etc. is often of great importance. By precisely tracking such vehicles, they can be allocated and positioned in a cost effective manner so as to provide the location of lost, delayed or damaged property. The space-based global positioning system (GPS) implemented by the United States Department of Defense (DOD) can be employed to determine geographical position in real time by the use of GPS receivers.

The GPS is a multiple satellite-based radio positioning system in which each GPS satellite transmits data that allows a user to precisely measure the distance from selected ones of the GPS satellites to his antenna so as to enable him to compute position, velocity and time parameters using known triangulation techniques. The signals provided by the GPS can be received both globally and continuously.

The GPS comprises three major segments. The segments are referred to as the space, control and user segments. The space segment consists of 21 operational satellites and three spare satellites. The satellites are positioned in a constellation such that typically seven, but a minimum of four satellites are observable by a user anywhere on or near the earth's surface. Each satellite transmits signals on two frequencies known as L1 (1575.42 MHz) and L2 (1227.6 MHz). The satellites use spread spectrum techniques that employ two types of spreading functions.

C/A (or coarse/acquisition code) and P (or precise) pseudo random noise (PRN) codes are transmitted on frequency L1, and P code only is transmitted on frequency L2. Individual bits in these PRN codes are referred to as chips. The C/A is available to any user, military or civilian, but the P code is only available to authorized military and civilian users. Both P and C/A codes contain data that enable a receiver to determine the range between a satellite and the user.

Superimposed on both the P and C/A codes is a navigation (NAV) message. A NAV message contains the GPS time; a handover word used in connection with the transition from C/A to P code tracking; ephemeris data for the particular satellites being tracked; and almanac data for all of the satellites in the constellation, including information regarding satellite health, coefficients for the ionospheric delay model for C/A code users, and coefficients used to calculate universal coordinated time (UCT).

The control segment comprises a master control station (MCS) and a number of monitor stations. The monitor stations passively track all GPS satellites in view, collecting ranging data and satellite clock data from each satellite. This information is passed on to the MCS where the satellite's future ephemeris and clock drift are predicted. Updated ephemeris and clock data are uploaded to each satellite for retransmission in each satellite's navigation message. The purpose of the control segment is to ensure that the information transmitted from the satellites is as accurate as possible.

The GPS is intended to be used in a wide variety of applications, including space, air, sea and land vehicle navigation, precise positioning, time transfer, altitude referencing and surveying.

A typical GPS receiver comprises a number of subsystems, including an antenna assembly, an RF (radio frequency) assembly, and a GPS processor assembly. The antenna assembly receives the L-band GPS signal and amplifies it prior to insertion into the RF assembly. A significant factor affecting accuracy of the computed position, velocity or time parameters is the positional geometry of the satellite selected for measurement of ranges. Generally, a best position solution is obtained using satellites having wide angles of separation. Considerable emphasis has therefore been placed on designing antenna systems to receive, with uniform gain, signals from any point on the hemisphere. This design approach provides tentative results in an expensive antenna assembly.

The RF assembly mixes the L-band GPS signal down to a convenient IF (intermediate frequency) signal. Using various known techniques, the PRN code modulating the L-band signal is tracked through code-correlation to measure the time of transmission of the signals from the satellite. The doppler shift of the received L-band signal is also measured through a carrier tracking loop. The code correlation and carrier tracking function can be performed using either analog or digital signal processing.

Control of the code in carrier tracking loops is provided by the GPS processor assembly. By differencing this measurement with the time of reception, as determined by the clock of the receiver, the pseudo range between the receiver and the satellite being tracked may be determined. The pseudo range includes both the range to the satellite and the offset of the clock from the GPS master time reference. The pseudo range measurements and navigation data from four satellites are used to compute a three-dimensional position and velocity fix, which calibrates the receiver's clock offset and provides an indication of GPS time.

In some known receivers, the receiver processor controller (RPC) functions are performed using a computer separate from that on which the navigation functions are performed. In other known receivers, both types of functions are performed by a single computer. The RPC processing and memory functions performed by a typical GPS receiver include monitoring channel status and control, signal acquisition and reacquisition, code and carrier tracking loops, computing pseudo range (PR) and delta range (DR) measurements, determining data edge timing, acquisition and storage of almanac and ephemeris data broadcast by the satellites, processor control and timing, address and command decoding, timed interrupt generation, interrupt acknowledgment control and GPS timing.

One type of known GPS receiver is described in U.S. Pat. No. 4,114,155, wherein the position of the receiver, which is responsive to C/A signals derived from multiple, orbiting spacecrafts, is determined to an accuracy greater than 300 meters. Each of the C/A signals has the same carrier frequency and a different, predetermined Gold code sequence that normally prevents position determination to be more accurate than to within 300 meters. C/A signals transmitted to the receiver are separately detected by cross-correlating received Gold code sequences with plural locally derived Gold code sequences. Four of the detected C/A signals are combined to compute receiver position to an accuracy of 300 meters. To determine receiver position to greater accuracy than 300 meters, the relative phase of internally-derived Gold code sequences is varied over the interval of one chip (i.e., pulse) of each sequence, to derive second cross-correlation values indicative of received and locally-derived Gold code sequences.

The basic approach followed most recently is to receive and process the signals from several of the GPS satellites in order to determine range to each satellite (and relative velocity). With perfect knowledge of range to only three of the GPS satellites, exact receiver position can be determined from the intersection of the three "spheres" induced by the known satellite positions and the derived receiver ranges. With receiver noise and imperfect knowledge of satellite positions, the receiver-satellite ranges can only be estimated. Typically, errors from receiver noise are reduced by (effectively) averaging many range calculations.

In the above most recent approach, the range from a particular satellite is estimated by reading a time stamp from the satellite's data stream (the transmission instant), subtracting this from the reception time, and multiplying the time difference by the speed of light. Any error in satellite and receiver clock synchronization leads to proportional range errors. Because the same clock is used in receiving from all satellites, there is only one unknown receiver clock "bias." By using a fourth (or more) satellite, the clock bias and ranges can be jointly estimated.

At the receiver, the reception time is determined by performing a cross-correlation of the received data with a local replica of the known satellite Gold code, and noting the time of the correlation peak, and its position relative to the time stamp. The satellite signal structures use Code Division Multiple Access (CDMA) so that the above cross-correlation is part of the standard receiver process.

All GPS-based systems require correlation between the GPS satellites and the receiver. Correlation requires that the satellite be identified according to its Gold code and ephemeral data. Since the power consumption of the RF circuitry is substantial, proper and rapid satellite identification is essential in a system requiring low power dissipation.

Heretofore, there has not been a correlation technique for rapid identification of individual satellites and their transmission strengths. It would be desirable to provide a correlator which could be used to rapidly track the identities of satellites in a GPS-based system and to monitor the intensities of their signal strengths. It would be further desirable to provide a parallel correlator circuit which could be utilized to track satellites in a GPS-based system. It would also be desirable to provide a correlator which correlates satellites based upon the Doppler shift of transmitted signals.

It would also be desirable to provide a correlator which can be utilized in other non-GPS or non-satellite based applications. These and other goals are achieved with the parallel correlator of the present invention.

SUMMARY OF THE INVENTION

In accordance with the present invention, a correlator for determining identity of an object comprises antenna means for receiving a signature signal transmitted from the object, an analog-to-digital converter coupled to the antenna for converting the signature signal from analog to digital form, a matched filter coupled to the converter for correlating the digital signal with at least one predetermined code sequence, and output means responsive to the filtered digital signal for producing a signal that identifies the object from its signature signal. The correlator can be utilized in a plurality of RF spread spectrum applications including GPS satellite communications.

In a preferred embodiment, the invention is directed to a correlator situated at a fixed location for determining identities of a plurality of satellites comprising an antenna for receiving a unique signature signal from each respective one of a plurality of global positioning satellites, amplification means coupled to the antenna for amplifying the signature signals of the satellites received by the antenna, analog-to-digital conversion means coupled to the amplification means for converting the amplified signature signals from analog to digital form, a capacitor matrix coupled to the analog-to-digital conversion means, and an output device coupled to the capacitor matrix for producing output signals that identify the satellites according to their signature signals. The capacitor matrix is made up of a plurality of rows of capacitors wherein each capacitor on an individual row is weighted in proportion to the signature signal of a respective individual global positioning satellite such that the output signal of the capacitor matrix corresponds to the signature signal of at least one of the satellites.

In a further preferred embodiment, the invention is directed to a 24-channel parallel correlator for use in a GPS-based system comprising an antenna for receiving a plurality of coded signals transmitted from up to 24 global positioning satellites, amplification means for amplifying the received coded signals, analog-to-digital converter means coupled to the amplification means for converting the received coded signals from analog to digital signals, a shift register responsive to the digital signals for producing signals characteristic, respectively, of each of the global positioning satellites, respectively, filter means for extracting codes from the coded signals received from the shift register, and output means for producing a signal identifying each satellite according to its respective code.

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE PREFERRED EMBODIMENT

The present invention constitutes a method and apparatus for achieving parallel correlation between transmitting objects simultaneously in view from a fixed site, location or monitoring station. System power may thus be conserved by limiting the "on-time" of the receiver to these intervals only, and by eliminating the need to generate or look up the Gold code sequences. System power is also conserved by performing the correlations with passive components.

In a preferred embodiment, the invention operates to determine identities of satellites, most preferably GPS satellites, visible from a point on earth, and also to determine strength of the signal coming from the satellite. Moreover, by employing simultaneous correlation for all possible satellites, a quicker time to first fix (TTFF) is achieved as a consequence of providing a nearly instantaneous measure of the satellites in view.

Figure 1:
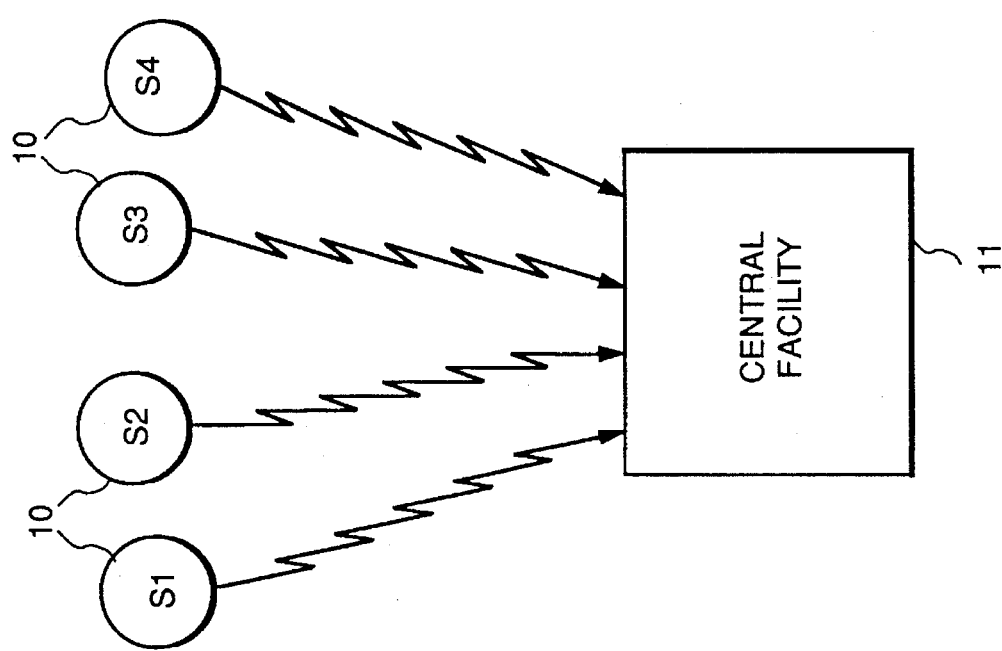
FIG. 1 is an illustration of GPS satellites in communication with a ground station.

As shown in FIG. 1, the GPS system comprises a plurality of satellites 10. While the invention is herein described in the context of a GPS-based system, it is applicable to any RF (CDMA) spread spectrum application, both space-based and non-space-based applications. The GPS system employs 21 satellites (only four of which are shown) along with three backup satellites (not shown). Each GPS satellite 10 transmits data using a unique Gold code which permits the user at a central facility 11 to precisely measure distance from selected ones of satellites 10 to his antenna and thereafter compute position, velocity and time parameters of an object (not shown) at a remote location. At the receiver, proper correlation with the satellite signal is an important requirement in the use and operation of the GPS system, as well as other systems wherein signals from other than GPS satellites are to be correlated.

GPS satellites 10 are positioned in a constellation such that typically seven satellites, but a minimum of four, are observable by a user anywhere on or near the earth's surface. The satellites transmit to central facility 11, which may be a ground station; however, central facility 11 may be mobile, seaborne and/or airborne. Satellites 10 transmit signals on two frequencies L1 (1575.42 MHz) and L2 (1227.6 MHz) using spread spectrum techniques that employ two types of spreading functions. C/A and P pseudo random noise (PRN) codes are transmitted on frequency L1, and P code is transmitted on frequency L2.

Figure 2:
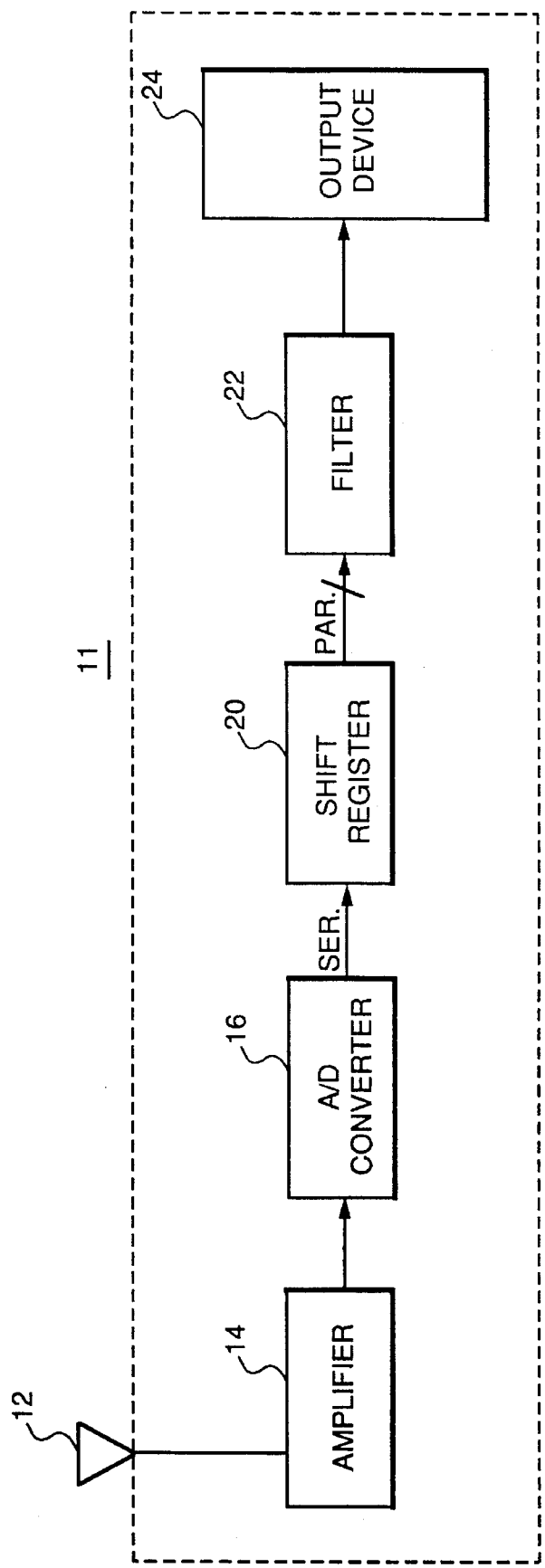
FIG. 2 is a block diagram of one embodiment of a correlator in accordance with the present invention.

FIG. 2 illustrates a preferred embodiment of the invention in which ground station 11 is shown having an antenna 12 for receiving signals from a plurality of GPS satellites. The signals, which include signature data comprised of Gold code PRN (pseudo random noise) data and ephemera, are amplified by apparatus, the output stage of which is represented as an IF (intermediate frequency) amplifier 14, and are limited and converted to digital form by an analog-to-digital converter 16. The digitized signals are serially applied to a shift register 20. The output signals of shift register 20 are applied in parallel to a filter circuit 22 which is tuned to filter the Gold code PRN signals for each respective one of the transmitting satellites.

The filtered Gold code PRN signals are identified on an output device 24, such as a cathode ray tube, liquid crystal display, or lighted panel. Alternatively, the Gold code PRN output signals may be provided to a microprocessor for further processing as may be desired. Using the system of the invention, the identity of each individual GPS satellite in view from the receiver can be quickly determined. It will be appreciated that the invention may also employ output circuitry for measuring the strength of each individual received signal, and/or for measuring doppler shift data relating to each satellite.

Figure 3:
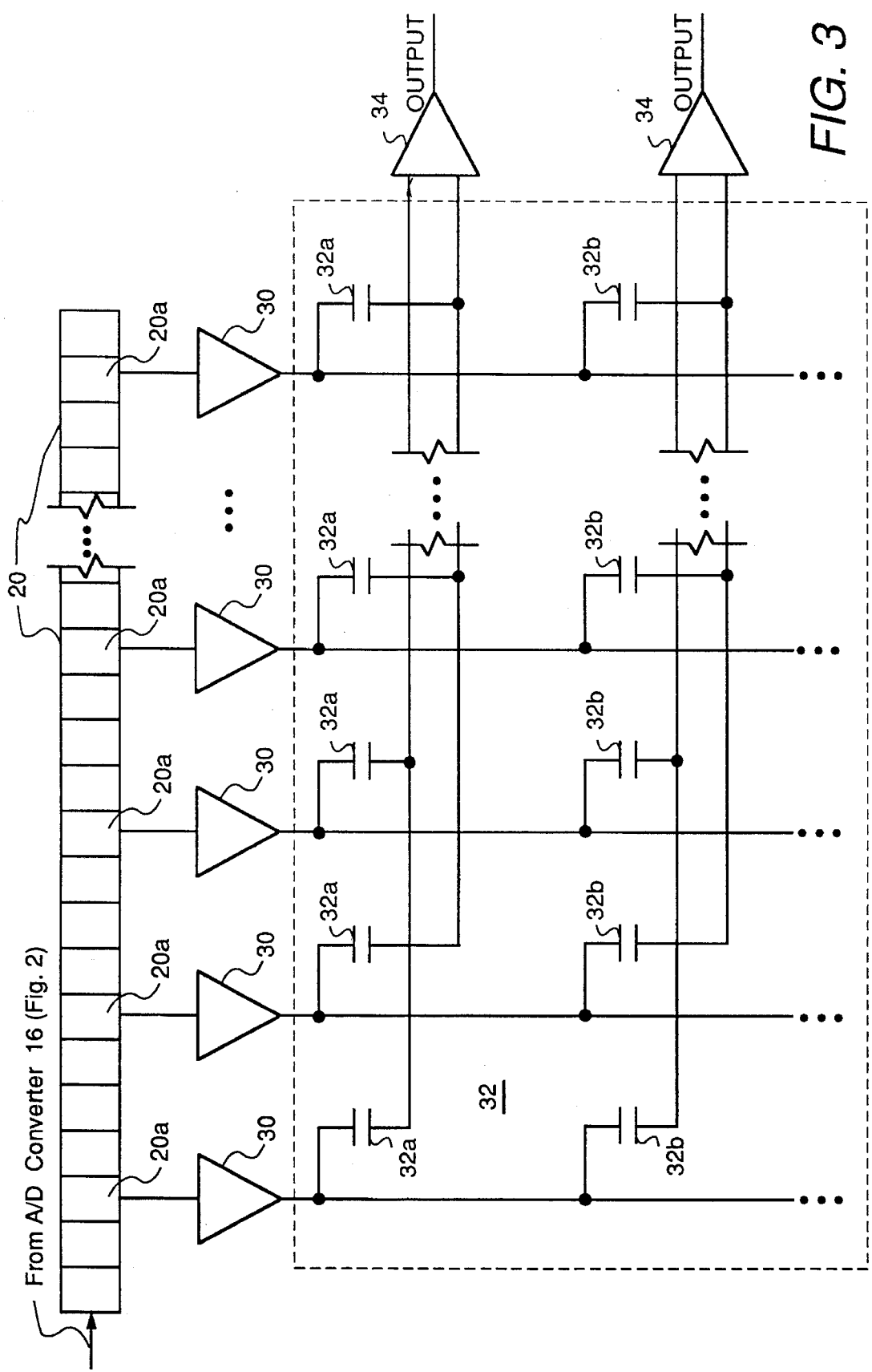
FIG. 3 is a block diagram of another embodiment of a correlator in accordance with the present invention.

FIG. 3 illustrates another preferred embodiment of the invention. In this embodiment, the down-converted L1 signal from each satellite is amplified, limited and converted to digital signals as described generally with respect to the embodiment of FIG. 1.

The Gold code PRN signal for each satellite is then sampled at periodic intervals and supplied to a long shift register 20. Preferably, the shift register should be sampled at a rate which is an integer multiple of the chip rate. Output signals from the shift register at appropriately separated stages 20a are amplified in respective column amplifiers 30. The column amplifiers drive a capacitor matrix 32 which functions as a filter circuit in this embodiment.

It will be appreciated that more than one sample from each chip could constitute an input signal to the column amplifiers so as to maximize processing gain and compensate for doppler effects in the incoming signal which may make an incoming chip look slightly longer or shorter.

Each of row capacitors 32a in matrix 32 is weighted proportional to the Gold code PRN sequences corresponding to individual satellites. Each row of capacitors 32a, 32b, ... feeds into a respective one of differential row amplifiers 34 with the positive or negative inputs allowing positive or negative values. Alternatively, as shown in FIG. 5, the column amplifiers may be differential amplifiers and the row amplifiers can then have single ended inputs.

The differential row amplifiers in the apparatus of FIG. 3 provide a signal which is maximized when the frequency L1 signal from a given satellite correlates with the proper Gold code for that satellite. The amplitude of the resulting signal is also an indication of the strength of the signal received from that particular satellite. By monitoring all of the matrix row output signals simultaneously, a near instantaneous measurement of which satellites are in view is provided. Thus the output signals resulting from signals transmitted from the four or more satellites in view constitute identification of those individual satellites. It will also be appreciated that the circuit shown in FIG. 3 could, for example, be cascaded to provide improved signal-to-noise ratio and bit transition boundaries.

Figure 4:
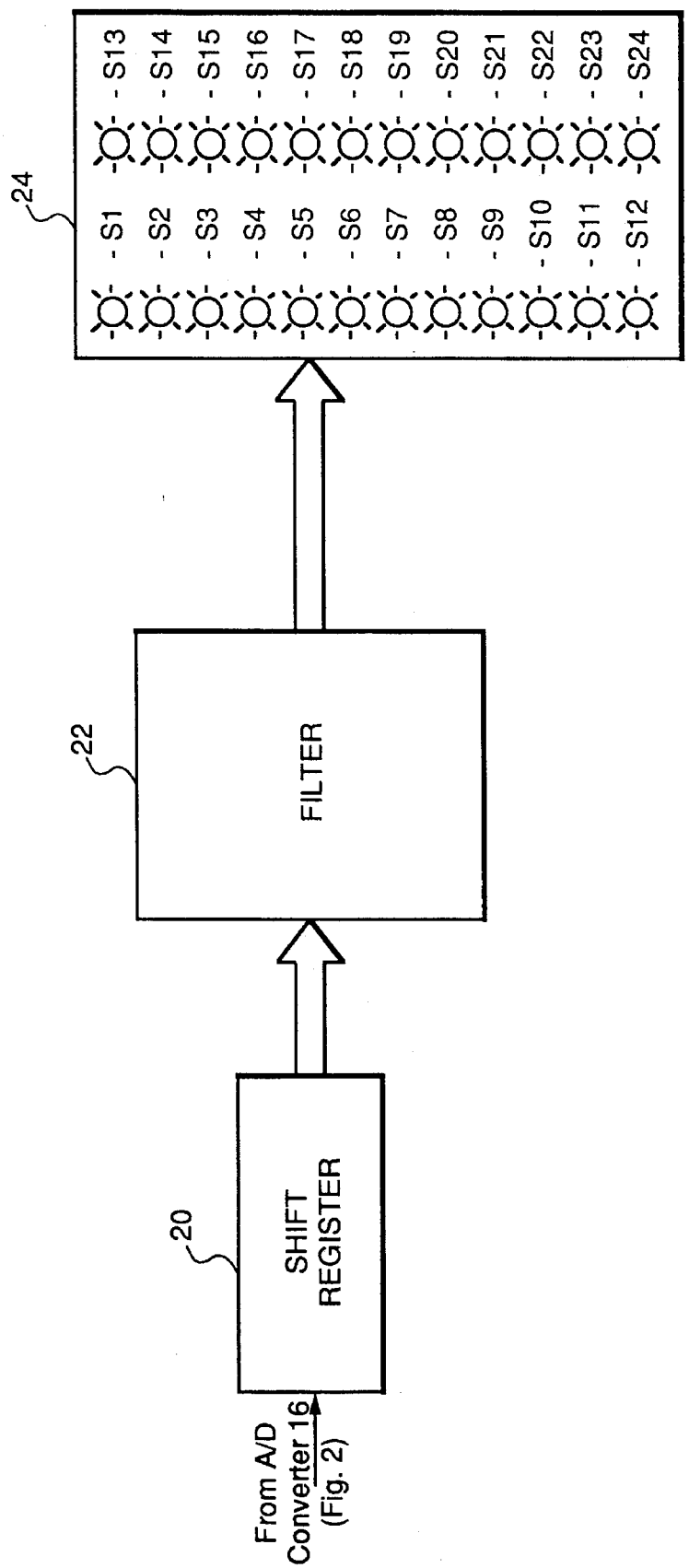
FIG. 4 is a block diagram of an alternative embodiment of a parallel correlator and output device in accordance with the present invention.

A preferred embodiment of an output device 24, utilized in ground station 11 (FIG. 2), is shown in FIG. 4. Output device 24 comprises a register which identifies the satellites in view at any one time (here, satellites S1–S4) from the ground station location, as processed through filter 22. Each output signal from register 24 is thus correlated with the appropriate satellite from whence the encoded signal originated.

Figure 5:
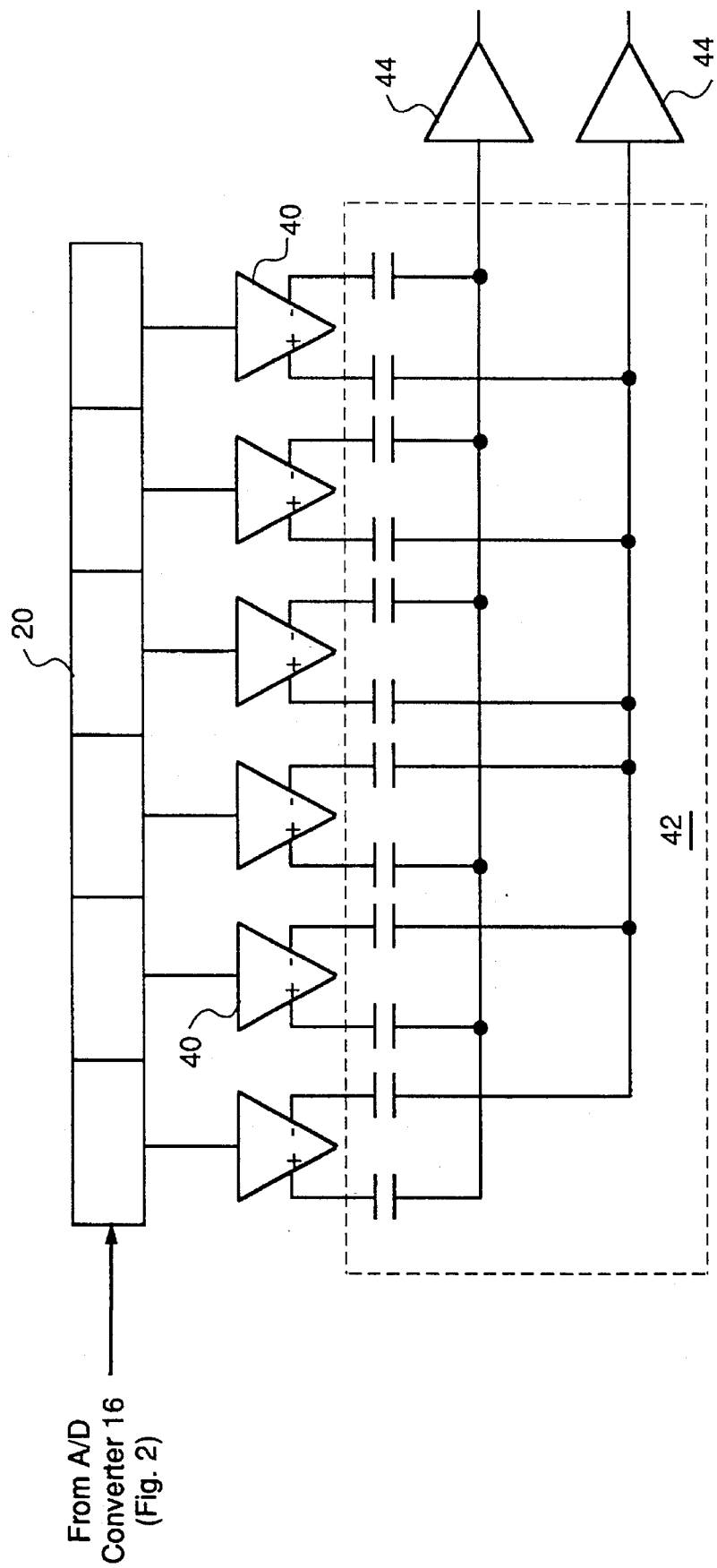
FIG. 5 is a block diagram of still another alternative embodiment of a parallel correlator in accordance with the present invention.

In comparison to the circuit shown in FIG. 3, the circuit shown in FIG. 5 allows a wider dynamic range to be achieved by driving positive and negative signals through differential amplifiers 40 into a capacitor matrix 42 which supplies signals to low impedance output amplifiers 44. It is to be noted, however, that it is generally easier to produce balanced drive signals than to achieve properly balanced differential amplifiers. The sampling rate of the digitization process should be at least twice the bandwidth of IF amplifier 14 driving A/D converter 16 (shown in FIG. 2).

The system of FIGS. 1–5 provides an alternative methodology for doppler searching. This function is preferably performed by scanning a local oscillator (not shown) over the entire range of expected doppler shifts. If more than one row of capacitors is provided for each satellite code, with proportionate weighted capacitors the range of doppler scanning can be reduced to the doppler interval between the predetermined doppler shifts corresponding to the multiple rows. Since total system power is largely determined by the doppler scan duration, power savings can be realized by providing multiple rows. This creates a technical compromise in which the number of doppler-shifted codes per satellite is limited in practice by the aspect ratio of the capacitor matrix.

To improve the signal-to-noise ratio, several identical integrated circuit chips, each containing the shift register and matched filter components shown in FIGS. 1-5 can be cascaded. Additionally, the boundaries between data bits, which occur every 20 code repetitions, can be detected by cascading two integrated circuit chips and looking for simultaneous but opposite polarity correlation peaks. This greatly simplifies recovery of the digital data that is encoded on the satellite bitstream.

As previously noted, the problem solved by the correlator of the present invention has broader application than GPS. For example, the invention can be used with a digital cellular phone system that employs code division multiple access techniques.

While only certain features of the invention have been illustrated and described, many modifications and changes will occur to those skilled in the art. The principles of the invention may be applicable to any number of space and non-space based communication systems requiring identification of a number of transmitting objects via correlation. For example, the invention may be used in a digital cellular phone system that employs code division multiple access (CDMA) techniques. It is, therefore, to be understood that the appended claims are intended to cover all such modifications and changes as fall within the true spirit of the invention.

What is claimed is:

1. A correlator for determining identities of a plurality of satellites comprising:

antenna means for receiving a unique signature signal from each one of a plurality of said satellites;

analog-to-digital converter means coupled to said antenna means for converting signature signals from analog form to digital form;

a capacitor matrix coupled to said analog-to-digital converter means, said matrix comprising a plurality of rows of capacitors wherein each of said capacitors in each respective row is weighted proportional to the signature signal of a respective one of said satellites such that each respective output signal of said capacitor matrix corresponds to the signature signal of a respective one of said satellites; and output means coupled to said capacitor matrix for producing signals that identify said satellites according to their respective signature signals.

2. The correlator of claim 1 wherein each row of said capacitor matrix is weighted proportional to a Gold code sequence of a respective one of said satellites.

3. A parallel correlator for use in a space-based GPS system, said correlator having a predetermined number of channels, comprising:

antenna means for securing a plurality of coded signals transmitted from a plurality of global positioning satellites ranging up to a predetermined number;

analog-to-digital converter means coupled to said antenna means for converting the coded signals from analog form to digital form;

a plural stage shift register for receiving the digital signals from the analog-to-digital converter means and for producing a plurality of signals;

a filter comprising a matrix of capacitors, said matrix having a plurality of rows and columns of capacitors, the respective capacitance of capacitors disposed in a respective row of said matrix corresponding to at least one respective Gold code sequence transmitted by one of said satellites, each respective column of capacitors in said matrix being coupled to a respective stage of said shift register; and output means coupled to each of said capacitor rows such that said output means is responsive to signals from said filter for producing a respective satellite identification signal for each of said satellites according to its respective Gold code.

4. A correlator for determining identity of a satellite comprising:

antenna means for receiving a signal from said satellite;

analog-to-digital converter means coupled to said antenna means for converting the received signal to a digital value;

filter means coupled to said analog-to-digital converter means, said filter means including a plurality of rows of capacitors wherein each capacitor value corresponds to a code unique to said satellite, said filter exhibiting a plurality of Doppler shifts of the signal received from said satellite when said filter is scanned with a local oscillator signal over a range of expected Doppler shifts and thereby producing an output signal that identifies the satellite by the detected Doppler shifts; and output means coupled to said filter for displaying identification of said satellite as determined from said Doppler shifts.

* * * * *